United States Patent
Goodner, III et al.

(10) Patent No.: US 6,643,080 B1
(45) Date of Patent: Nov. 4, 2003

(54) RESONANCE IDENTIFICATION BY COMMANDING A SPINDLE SPEED CHANGE

(75) Inventors: Clyde Everett Goodner, III, Midwest City, OK (US); Roy Lynn Wood, Oklahoma City, OK (US); Lealon Ray McKenzie, Edmond, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 361 days.

(21) Appl. No.: 09/626,029

(22) Filed: Jul. 27, 2000

Related U.S. Application Data

(60) Provisional application No. 60/150,721, filed on Aug. 25, 1999.

(51) Int. Cl.$^7$ .................. G11B 27/36; G11B 21/02; G11B 15/46
(52) U.S. Cl. .................. 360/31; 360/75; 360/73.03
(58) Field of Search .................. 360/73.01, 73.03, 360/78.04, 75, 77.02, 31; 318/611, 560

(56) References Cited

U.S. PATENT DOCUMENTS

| | | | |
|---|---|---|---|
| 4,963,806 A | | 10/1990 | Shinohara et al. |
| 5,325,247 A | | 6/1994 | Ehrlich et al. |
| 5,859,742 A | * | 1/1999 | Takaishi ............ 360/78.01 |
| 6,026,418 A | * | 2/2000 | Duncan, Jr. ............ 708/309 |
| 6,078,458 A | * | 6/2000 | Fioravanti et al. ....... 360/73.03 |
| 6,153,998 A | * | 11/2000 | Takakura ............ 318/560 |
| 6,204,988 B1 | * | 3/2001 | Codilian et al. ............ 360/75 |
| 6,417,982 B1 | * | 7/2002 | Ottesen et al. ............ 360/77.02 |
| 6,496,323 B1 | * | 12/2002 | Umeda et al. ............ 360/78.09 |
| 6,519,496 B1 | * | 2/2003 | Kawabe et al. ............ 700/55 |

FOREIGN PATENT DOCUMENTS

WO    WO99/36914    * 7/1999

* cited by examiner

*Primary Examiner*—Andrew L. Sniezek
(74) *Attorney, Agent, or Firm*—David K. Lucente; Derek J. Berger

(57) ABSTRACT

Method and apparatus for identifying a resonance by changing a spindle speed, which has the effect of changing a corresponding sampling rate and Nyquist frequency. The invention discriminates (1) between plausible frequencies of true resonance and/or (2) aliased resonance from non-aliased resonances. This is accomplished by monitoring whether and/or how a resonance shifts during this speed change. Methods of the present invention monitor resonances by deriving a resonance indicator such as an apparent frequency (below the Nyquist frequency), a gain or error magnitude (compared to a derived threshold at a calculated frequency of interest), or similar criteria tested by values conventionally illustrated on a Bode plot. The present invention further includes steps or structural features for configuring a controller to attenuate or similarly limit an unwanted frequency component of an actuator control signal. In this way, resonances in the actuator can be reduced, and servo speed and accuracy thereby enhanced.

11 Claims, 4 Drawing Sheets

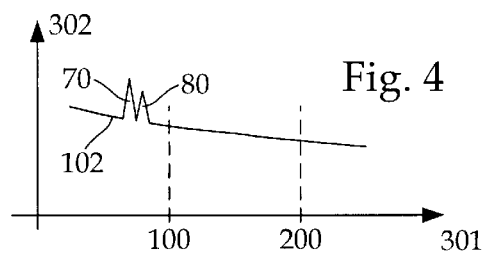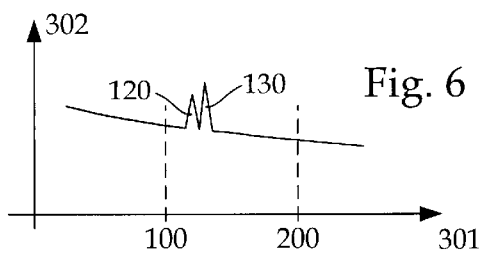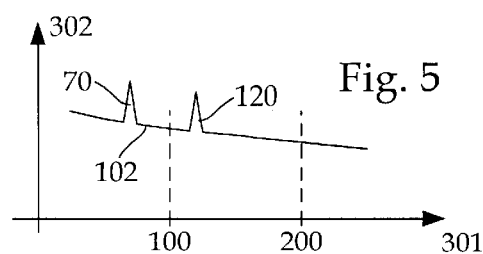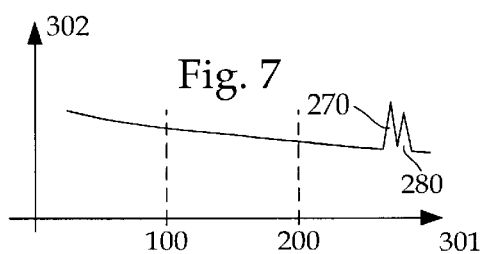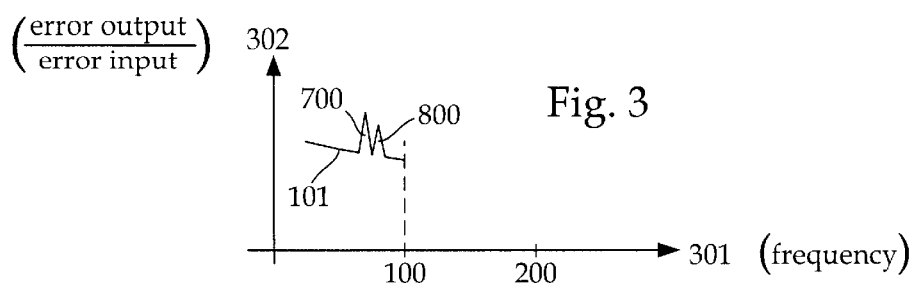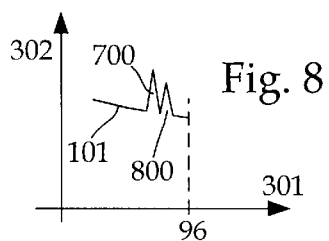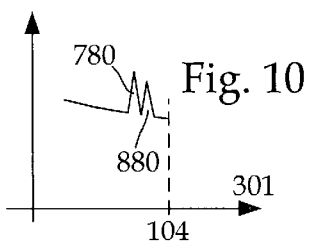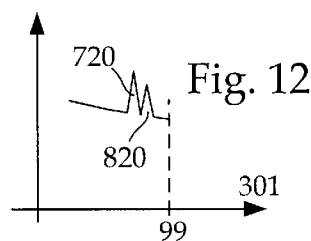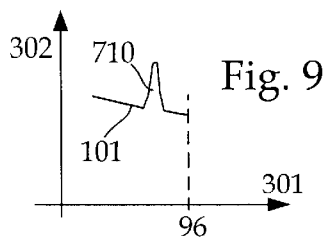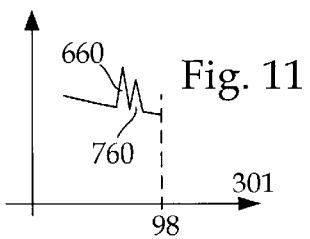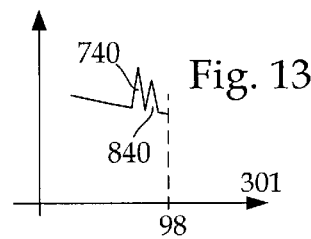

RESONANCE IDENTIFICATION BY COMMANDING A SPINDLE SPEED CHANGE

RELATED APPLICATIONS

This application claims the benefit of U.S. Provisional Application No. 60/150,721 filed on Aug. 25, 1999.

FIELD OF THE INVENTION

The present invention relates to positioning actuators of electromechanical systems, and more particular to highly fast and precise servo positioning systems such as those employed in disc drives.

BACKGROUND OF THE INVENTION

Disc drives of the type known as "Winchester" disc drives, or hard disc drives, are well known in the industry. Such disc drives magnetically record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 15,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative pneumatic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspension tabs.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator bearing housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator bearing housing opposite to the coil, the actuator bearing housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator bearing housing, with the attached head suspensions and head assemblies, in accordance with the well-known Lorentz relationship. As the actuator bearing housing rotates, the heads are moved radially across the data tracks along an arcuate path.

The movement of the heads across the disc surfaces in disc drives utilizing voice coil actuator systems is typically under the control of closed loop servo systems. In a closed loop servo system, specific data patterns used to define the location of the heads relative to the disc surface are prerecorded on the discs during the disc drive manufacturing process. The servo system reads the previously recorded servo information from the servo portion of the discs, compares the actual position of the actuator over the disc surface to a desired position and generates a position error signal (PES) reflective of the difference between the actual and desired positions. The servo system then generates a position correction signal which is used to select the polarity and amplitude of current applied to the coil of the voice coil actuator to bring the actuator to the desired position. When the actuator is at the desired position, no PES is generated, and no current is applied to the coil. Any subsequent tendency of the actuator to move from the desired position is countered by the detection of a position error, and the generation of the appropriate position correction signal to the coil.

One problem with servo-controlled actuator systems is that errors can result from vibrations produced at resonance frequencies of the actuator. As the operating frequency of the actuator system is varied, resonance can result at natural vibrational modes of the actuator and intervening mechanical components. This resonance causes excitation of the actuator, which can result in excessive settling time and reduced tracking ability of the supported heads.

It has been known to address this problem by providing gain stabilizing filters such as electronic notch filters within the servo control loop. These notch filters are placed in the downstream portion of the control loop to filter out the signal information within the band reject frequency range of the notch and thus help minimize excitation of the actuator. This allows the servo control system to effectively ignore lightly damped structural actuator resonances. At the resonances very little control is applied by the servo controller.

While notch filters are an effective solution to the problem of resonance, vibrational modes of actuator systems can be difficult to predict, especially as these systems become more mechanically complex. As a result, designers often must measure the resonance of a drive in an attempt to predict the resonance properties of a production lot of similar drives. Measurement has been complicated by confusion caused by resonance at levels above what is known as the Nyquist frequency, which is equal to half the frequency of the sampling control system. When a mechanical resonant frequency lies above the Nyquist frequency, it will appear as an alias in the control spectrum below the Nyquist limit. It is therefore often difficult to distinguish true resonance frequencies which are below the Nyquist from mere aliases. If notch filters are applied at aliases, the control system can become overly desensitized.

Some designers distinguish true resonant frequencies from aliases by substituting a frequency generator for the drive crystal in a test drive, thereby changing the servo system sample frequency. When the sample frequency is varied, change in alias frequencies can be observed while true resonance frequencies remain constant, and notch filters can be placed at true resonance frequencies only. This method ordinarily requires permanent and/or time-consuming customization of the drive.

There is a continuing need in the industry to identify and characterize resonances of a drive without such modifications, or even of a significant sample of a production lot of disc drives.

SUMMARY OF THE INVENTION

The present invention identifies a resonance by changing a spindle speed, which has the effect of changing a corresponding sampling rate and Nyquist frequency. The invention discriminates (1) between plausible frequencies of true resonance and/or (2) aliased resonance from non-aliased resonances. This is accomplished by monitoring whether and/or how a resonance shifts during this speed change. Methods of the present invention monitor resonances by deriving a resonance indicator such as an apparent frequency (below the Nyquist frequency), a gain or error magnitude (compared to a derived threshold at a calculated frequency of interest), or similar criteria tested by values conventionally illustrated on a Bode plot.

The present invention further comprises steps or structural features for configuring a controller to attenuate or similarly limit an unwanted frequency component of an actuator control signal. In this way, resonances in the actuator can be reduced, and servo speed and accuracy thereby enhanced. Further features and benefits of the present invention will be apparent upon a review of the following figures and their accompanying explanation.

BRIEF DESCRIPTION OF THE DRAWINGS

FIG. 3 shows a Bode plot having primary and secondary resonances, but not indicating the actual frequencies of those resonances.

FIG. 4 shows a model of an actual response of an electromechanical system that is deemed "plausible" because it is consistent with the Bode plot of FIG. 3.

FIGS. 5, 6 & 7 each shows another equally plausible model of an electromechanical system, further illustrating the ambiguity of the Bode plot of FIG. 3.

FIG. 8, shows a Bode plot similar that of FIG. 3, but having experienced a shift due to a change in spindle speed that reflects an electromechanical system like that of FIG. 4.

FIG. 9 shows another shifted Bode plot consistent with the Bode plot of FIG. 3 and with the system of FIG. 5.

FIGS. 10 & 11 each shows another shifted Bode plot consistent with the system of FIG. 6.

FIGS. 12 & 13 each shows another shifted Bode plot consistent with the system of FIG. 7.

DETAILED DESCRIPTION

Figure 1:
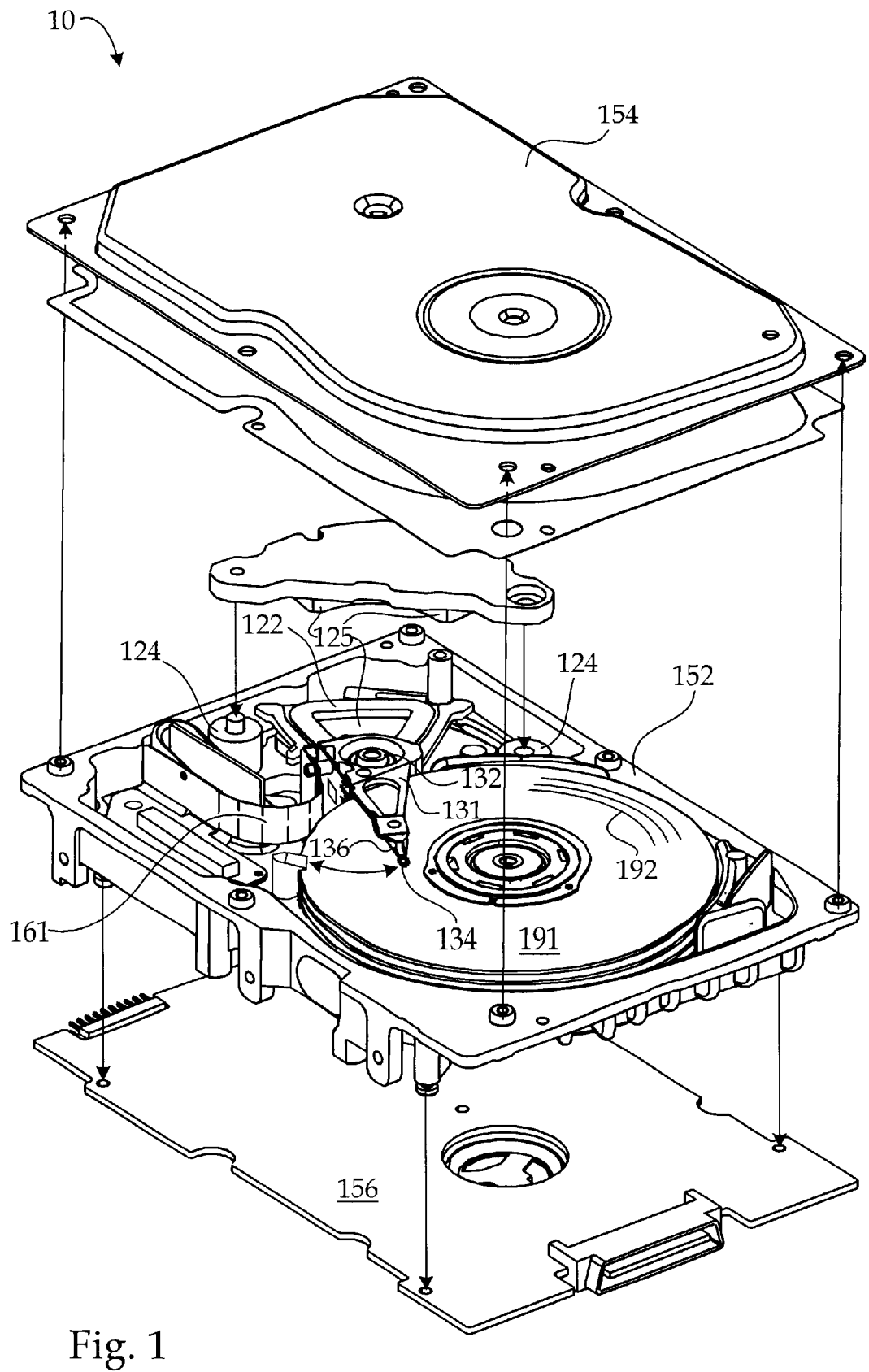
FIG. 1 shows an exploded view of a disc drive implementing the present invention.

Where practical, features shown in the figures are drawn to scale. Like reference numerals refer to like features, throughout the following figures and descriptions.

Numerous aspects of servo positioning systems that are not a part of the present invention, or are well known in the art, are omitted for brevity. These include (1) specific techniques for measuring amplitude or gain as a function of frequency; (2) specific firmware or circuitry implementing servo control; and (3) specific techniques for implementing a desired notch or band-block filter. Although each of the many examples below shows more than enough detail to allow those skilled in the art to practice the present invention, subject matter regarded as the invention is broader than any single example below. The scope of the present invention is distinctly defined, however, in the claims at the end of this document.

Turning now to the drawings and specifically to FIG. 1, shown is an exploded view of a disc drive 10, an electromechanical system in which the present invention is particularly useful. The disc drive 10 includes a base member 102 to which all other components are directly or indirectly mounted and a top cover 154 which, together with the base member 152, forms a disc drive housing which encloses delicate internal components and isolates these components from external contaminants.

The disc drive includes a plurality of discs 191 which are mounted for rotation on a spindle motor (not shown). The discs 191 include on their surfaces a plurality of circular, concentric data tracks 192 on which data are recorded via an array of vertically aligned head assemblies (one of which is shown at 134). The head assemblies 134 are supported by head suspension tabs 136, which are attached to arm portions of actuator 131. The actuator 131 is mounted for rotation about a pivot shaft 132.

Power to drive the actuator 131 about the pivot shaft 132 is provided by a voice coil motor (VCM). The VCM consists of a coil 122 which is supported by the actuator 131 within the magnetic field of an array of permanent magnets 125 which are fixedly mounted to the base member 152 by support members 124, all in a manner well known in the industry. Electronic circuitry 156 to control all aspects of the operation of the disc drive 10 is provided, with control signals to drive the VCM, as well as data signals to and from the heads 134, carried between the electronic circuitry 156 and the moving actuator assembly 131 via a flexible printed circuit cable (PCC) 161. According to the present embodiment, electronic circuitry 156 is configured to reduce mechanical resonances (especially those in arm portions of actuator 131) by attenuating an unwanted frequency component according to a method such as those depicted in FIGS. 2 & 14. In a preferred embodiment, measurements or calculations from the disc drive 10 (or from other drives similarly manufactured) are provided to firmware resident in the electronic circuitry 156 to tune servo control operation.

Figure 2:
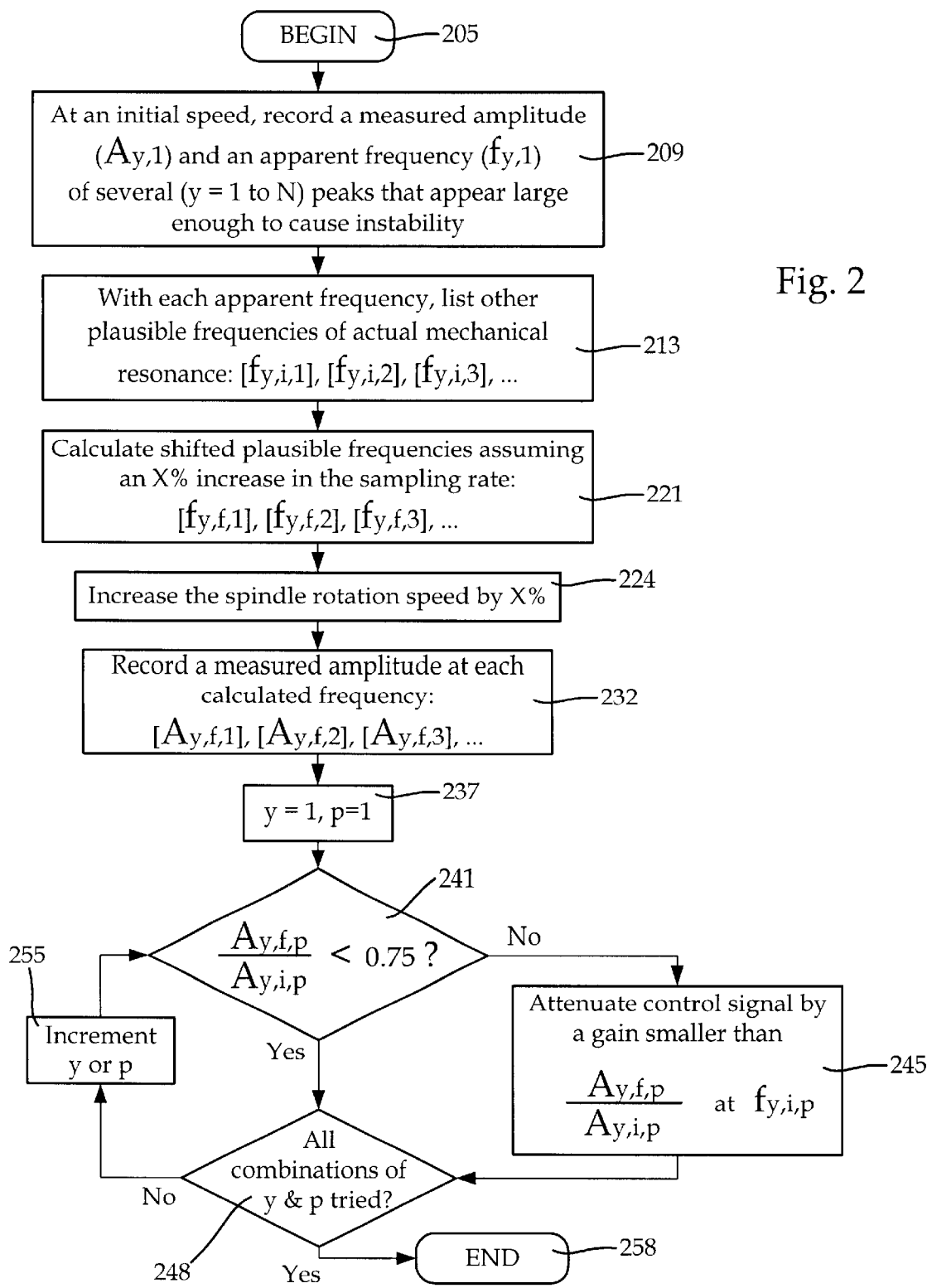
FIG. 2 shows a configuration method of the present invention.

FIG. 2 depicts a configuration method of the present invention comprising steps 205 through 258. At an initial disc or spindle rotation speed, information about at least one large peak is recorded 209. This information includes an apparent resonance frequency and a measured amplitude. Using a priori information about the spindle motor speed (which is linked to the sample rate and therefore to the Nyquist frequency), a list of plausible frequencies of actual resonance is generated 213. With most electromechanical systems of the general type depicted in FIG. 1, four plausible frequencies in addition to the apparent resonance frequency will usually be more than enough. From this list, a list of shifted frequencies is then generated 221. The spindle rotation is then increased or decreased 224, and amplitudes of the shifted frequencies are obtained 232. Step 232 is easier to perform than step 209 because there is no need to perform peak-finding steps.

Once the data-gathering steps 209 through 232 are complete, a search is initialized 237 through each unique combination of plausible frequency and resonance peak. For each combination, it is determined whether a substantial drop resulted from the spindle rotation speed change 241. At each frequency where such a change does not occur, a control signal is attenuated 245. As is known in the art, such attenuations can readily be implemented in firmware by a digital notch filter. The method increments 255 through the combinations until all generated combinations have been tried 248.

FIG. 3 depicts a Bode plot, which can be generated with commercially available equipment by a great variety of known methods. For example, a small sinusoidal perturbation can be provided to voice coil 122, and a signal from head 134 containing servo samples indicating radial location can be monitored. Many modern discs 191 have data surfaces divided into several annular data zones. Ordinarily, the number of servo samples per disc rotation is nominally constant throughout the disc, or at least within each data zone. The ratio between the spindle rotation speed and the sample rate is usually a fixed (dimensionless) ratio between 30 and 300. For a spindle speed of 166 rotations per second, therefore, about 20,000 position samples are ordinarily available each second. With a sample rate 200 of 20.0 kHz, the Nyquist frequency 100 is 10.0 kHz.

Reference numbers in FIGS. 3–13 have been selected to aid readability. Some labeled frequencies 96,98,99,100,104, 200 on FIGS. 3–13 indicate an actual frequency of 96X,98X, 99X, 100X,104X, and 200X, respectively, where X can be any increment of frequency (e.g. 100 Hz or 99.7 Hz). Similarly, some labeled resonances 700,720,740,780,840, 880 have a peak at an actual frequency of 700Y,720Y,740Y, 780Y,840Y,880Y, respectively, where Y=X/10.

A Bode plot such as FIG. 3 depicts an error-magnifying transfer function 302 plotted versus frequency 301. In disc drives, such transfer functions may have frequency spikes of an order of magnitude or more. Note also that the transfer function 302 (schematically depicted in decibel units of microns per micron) need only be accurate enough to show some indication of amplitude, but that the relationships relating to frequency 301 are shown very close to scale. This is not uncommon for Bode plots.

Below the Nyquist frequency 100 of FIG. 3, assumed to be 10.0 kHz, a measured response 101 is shown with a primary apparent resonance 700 (at 7.0 kHz) and a secondary apparent resonance 800 at (at 8.0 kHz). Unfortunately, a measured Bode plot showing such resonances 700,800 is ambiguous as to the frequency of actual resonance(s) causing each apparent resonance 700,800. In the present case, it is unclear from FIG. 3 whether the 7.0 kHz apparent resonance corresponds to an actual resonance at that frequency, or to some other actual resonance at any of several frequencies larger than 10.0 kHz. In fact, any of the actual response curves 102 of FIG. 4, FIG. 5, FIG. 6, or FIG. 7 would result in the measured response curve 101 of FIG. 3. The method of FIG. 2 provides a way to distinguish which of them is likely to characterize the physical system best.

FIG. 4 models an actual response of an electromechanical system, which is difficult to measure directly. Primary and secondary actual resonances 70,80 are not aliased by sampling such a system at 20.0 kHz, as shown in FIG. 3. Unfortunately, one cannot safely assume nor readily prove that the resonances are not aliased, particularly when first examining a prototype of a new disc drive design. Compensating for aliased (false) resonances introduces distortion and instability into a control system, and should be avoided.

FIG. 5 is an equally valid model of an actual response of an electromechanical system. It includes a primary actual resonance 70 at 7.0 kHz, the same primary actual resonance 70 depicted in FIG. 4. FIG. 5 also includes a secondary actual resonance 120 at 12.0 kHz, which will be aliased as shown because it is above the Nyquist frequency 100 (of 10.0 kHz).

The primary actual resonances 130,270 and the secondary actual resonances 120,280 shown in FIGS. 6 & 7 will similarly be aliased as shown. Actual resonances which are consistent with a given measured apparent resonance are called "plausible" in this document. With this definition, all of the resonances 70,80,120,130,270,280 in FIGS. 4 through 7 are "plausible" because they would result in the Bode plot of FIG. 3 if measured at sample rate 200.

FIG. 8 shows a Bode plot identical to that of FIG. 3, except that a shift in the sampling frequency 200 of FIG. 3 (from 20.0 kHz to 19.2 kHz) has caused the initial Nyquist frequency 100 to shift to a "final" Nyquist frequency 96 of 9.6 kHz. It can be seen that the apparent resonances 700,800 of FIG. 3 did not shift as a result of this change in the sample rate 200. It can therefore be concluded that these resonances 700,800 are not aliased. Thus, a system which exhibits a Bode plot like that of FIG. 8 is consistent with a model like FIG. 4 but inconsistent with those of FIGS. 5 through 7.

FIG. 9 shows a Bode plot with a "final" Nyquist frequency 96 of 9.6 kHz, like that of FIG. 8. In lieu of the primary and secondary apparent resonances 700,800, a very large resonance 710 is seen. Referring again to FIG. 5, it should be understood that shifting the Nyquist frequency 100 down to 9.6 kHz would not shift the frequency of the actual resonance 120 at 12.0 kHz. Such a Nyquist shift will shift the apparent frequency of secondary actual resonance, though. As the Nyquist frequency drops to 9.6 kHz, the apparent frequency of the secondary resonance 120 will shift from 10.0 kHz–(12.0 kHz–10.0 kHz)=8.0 kHz to 9.6 kHz–(12.0 kHz–9.6 kHz)=7.2 kHz. With a frequency this low, the apparent resonance overaps signicantly with the non-aliased resonance at 7.0 kHz. These two superposed resonances, in fact, make up the very large resonance 710 seen in FIG. 9.

Returning to the embodiment of FIG. 2, the operation of this method can now be clarified with a numerical example. Suppose that a system consistent with the Bode plot of FIG. 3 is found, but it is not known whether the secondary resonance 800 at 8.0 kHz (y=2) is aliased. At an initial spindle speed (corresponding to a Nyquist frequency 100 of 10.0 kHz), an apparent frequency of 8.0 kHz is recorded (step 209). A list is generated 213 that includes the apparent frequency of 8.0 kHz, and further includes 12.0 kHz and 28.0 kHz. These are deemed plausible frequencies of actual mechanical resonance.

Next, shifted frequencies are calculated assuming a 4% decrease in the sampling rate (X equals –4). Note that the present invention contemplates some embodiments for which X has a magnitude of 15 or more. Assuming each of the listed plausible frequencies is sampled at 19.2 kHz, the corresponding frequencies are calculated as 8.0 kHz, 7.2 kHz, and 8.8 kHz (step 221 of FIG. 2). Meanwhile, a spindle speed command reduces the spindle rotation speed by 4% (step 224) causing the sampling rate to drop from 20.0 kHz to 19.2 kHz.

P is initialized (step 237), and a determination is made whether the amplitude A of the measured response 101 dropped substantially at a frequency of 8.0 kHz. The answer will be no for a system like that of FIG. 4, as shown in corresponding FIG. 8. The answer will be yes for a system like that of FIG. 5, as shown in corresponding FIG. 9. Therefore, only a system like that of FIG. 4 will undergo the attenuation step 245. This is the desired result, in light of the fact that attenuation at 8.0 kHz is desirable for the actual resonance 80 of FIG. 4, but is undesirable for the system of FIG. 5, which has no resonance at 8.0 kHz.

Referring once again to FIG. 2, further evaluations are performed (step 241) for subsequently incremented values of p (p=2 and p=3, incremented at step 255). As compared with FIG. 3, note that FIGS. 8 & 9 do not have a lower measured response 101 at either 7.2 kHz or 8.8 kHz. Therefore, the final gain $A_{y,f,p}$ is at least as large as the initial gain $A_{y,i,p}$, and attenuation step 245 is not performed again.

In this example, the method of FIG. 2 successfully distinguished that the apparent resonance 800 of FIG. 3 resulted from a non-aliased actual resonance 80 and not from an aliased resonance 120. Further, the method of FIG. 2 appropriately attenuated (by notching or band-block filtering) an undesirable component at the actual resonance 80. Additionally, the method of FIG. 2 appropriately refrained from needlessly attenuating any false (aliased) resonance. It can be shown that the method of FIG. 2 discriminates equally well for systems like those of FIGS. 6 & 7.

FIG. 10 shows a Bode plot with a primary apparent resonance 780 (at 7.8 kHz), a secondary apparent resonance 880 (at 8.8 kHz), and a Nyquist frequency 104 (at 10.4 kHz). Suppose that measurements are collected indicating these initial resonances with a sampling rate at 20.8 kHz. Suppose further that the spindle speed is reduced at least enough so that spikes shift left by at least about 0.2%, at least enough so that an amplitude level comparator like the threshold of step 241 can detect that an aliased spike has shifted. Such a shifted Bode plot is shown at FIG. 3. Alternatively, the size of a speed change can be limited so as to stop when its value has changed by 1% or frequency-shifted an aliased resonance by 1 to 2 times the width of the resonance.

If a small Nyquist frequency shift (e.g. 400 Hz) causes each apparent resonance to shift twice as far (i.e. 800 Hz) in the same direction, it can be inferred that each apparent resonance corresponds to an actual resonance greater than the Nyquist frequency 100 but less than the sampling frequency 200. The electromechanical system of FIG. 6 can generate the Bode plot of either FIG. 3 or FIG. 10, depending on the sampling frequency 200.

FIG. 11 similarly illustrates a further, smaller shift (200 Hz) to Nyquist frequency 98 (9.8 kHz) and to primary and secondary apparent resonances 660,760 (at 6.6 kHz and 7.6 kHz respectively). FIGS. 10 & 11 thus illustrate how shifting the sampling rate 200 by a small amount either up or down can provide the requisite shift so that aliased frequencies will be revealed, in a system like that of FIG. 6.

FIGS. 12 & 13 each reveal a similar shift from an initial primary resonance 720 to a final primary resonance 740 (shifting right). An initial secondary resonance 820 simultaneously shifts right to become a final secondary resonance 840. Both of these were caused by a left-shift from initial Nyquist frequency 99 to final Nyquist frequency 98. Note, in this case, that the shifts are in opposite directions. This is consistent with actual resonances 270,280 between two and three times the Nyquist frequency, as exemplified in FIG. 7.

Figure 14:
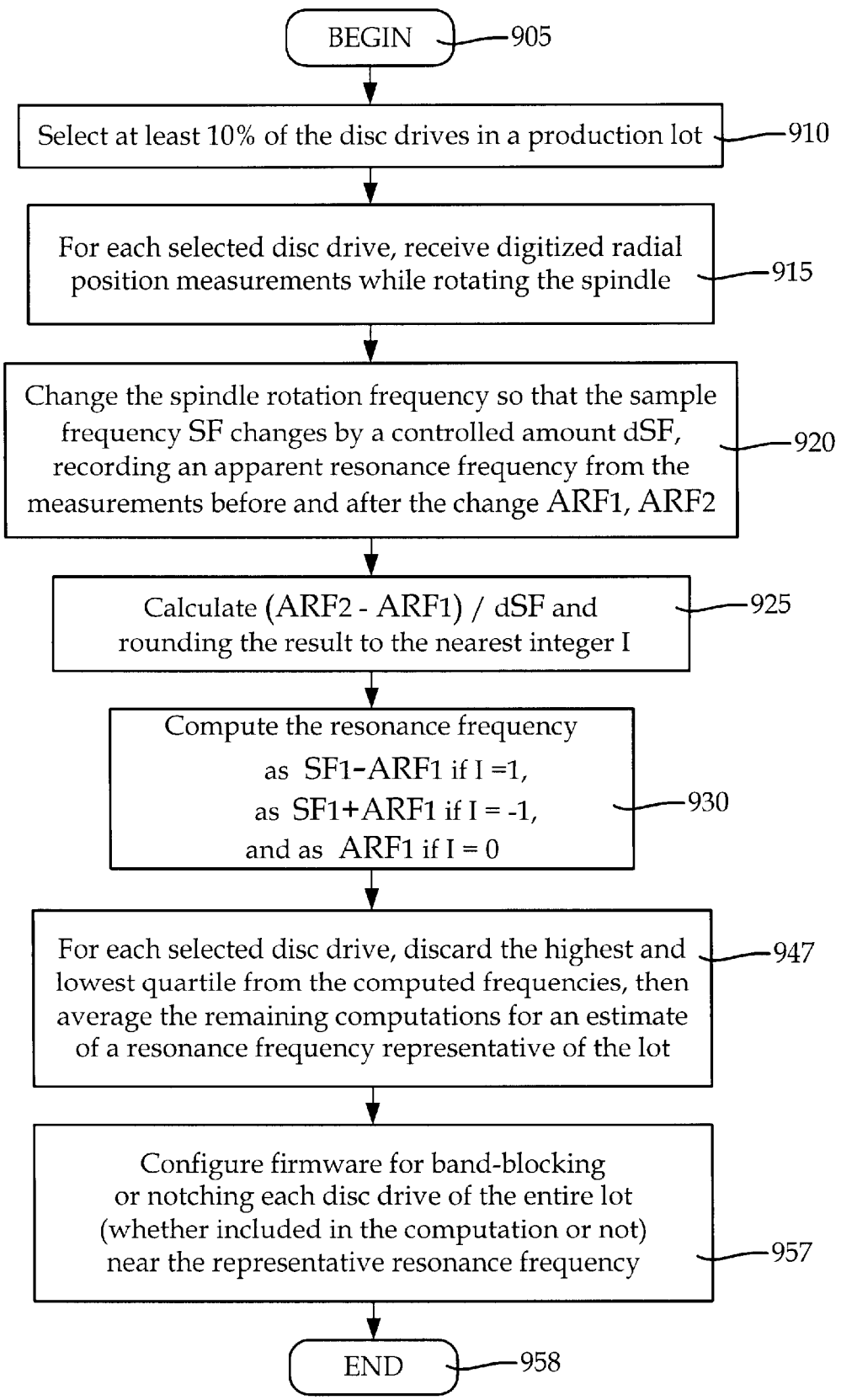
FIG. 14 shows another method of the present invention, particularly suited to a manufacturing context.

FIG. 14 shows a manufacturing method of the present invention comprising steps 905 through 958. Suppose 1000 disc drives are in a production lot, all partially manufactured substantially identically up until the application of the present method. At least one hundred of these are selected 910. For each selected drive, servo samples are received 915 at an initial sample frequency (SF). In step 920, the spindle is then accelerated and/or decelerated so that SF changes by a controlled amount (dSF).

In step 925, a calculation is performed. Returning again to FIGS. 12 & 13, a numerical example will be explained. Suppose that Nyquist frequencies 99,98 refer to respective frequencies of 4.95 kHz and 4.90 kHz, so that $SF_1$ is 9.9 kHz and dSF is −0.10 kHz. Suppose further that primary resonances 720 and 740 have characteristic frequencies 3.60 kHz (=$ARF_1$) and 3.70 kHz (=$ARF_2$), respectively. Suppose further that secondary resonances 820 and 840 have characteristic frequencies at 4.10 kHz and 4.20 kHz, respectively. $ARF_2 - ARF_1 = +0.1$ kHz, so $I = +0.1$ kHz$/-0.1$ kHz$=-1$. According to step 930, the primary actual resonance therefore has a frequency computed as 9.9 kHz+3.6 kHz=13.5 kHz. Note that this corresponds to actual resonance frequency 270 on FIG. 7.

Data that might be anomalous is discarded, and the remaining computed resonance frequencies are averaged 947. An indicator of distribution (such as standard deviation) is optionally also ascertained. This average and standard deviation are reliable indicators of resonance frequency ranges for the entire lot from which firmware is then configured. Note that this technique is feasible for large samples, unlike aliased frequency determinations using prior methods.

Alternatively characterized, a first contemplated embodiment of the invention is a method of configuring an electromechanical system 10 having a rotating spindle with a controllable rotation speed. While the spindle is rotating, a position-indicative signal is received and an indicator of a resonance 700 is derived from it. In a disc drive 10, this may involve receiving digitized signals indicating a head's radial position from servo wedges 915 that are available at a sampling rate that depends upon spindle rotation speed.

In some embodiments, the resonance indicator may be a peak frequency of the detected (apparent) resonance. Alternatively, the indicator may be a transfer function magnitude (or similar indicator of signal magnitude) at the frequency of detected resonance or at other frequencies of interest derived therefrom 221,232. Based upon teachings herein, one of ordinary skill will be able to select a suitable resonance indicator as a matter of design choice. Implementing compensation for resonances derived by teachings herein is best accomplished by digital notch filters in encoded in a nonvolatile memory (i.e. firmware), but other implementations are likewise within the ordinary skill of a designer based on these teachings.

The resonance indicator is monitored before and after changing the spindle speed 224,920. Depending on how and/or whether a change in the resonance indicator is detected during the spindle speed change, the system is configured to generate a servo control signal having an attenuated gain at the estimated resonance frequency 245, 930. In a preferred embodiment, whether an estimated resonance frequency is notched will depend primarily on whether the resonance indicator shifts as the spindle speed changes. A resonance indicator that does not shift indicates that the corresponding resonance is actual, not aliased. Aliased frequencies will shift by a frequency increment that depends upon the relationship between the apparent resonance frequency and the sampling rate, which depends upon the spindle rotation speed. For example, an aliased resonance 130 may be between a Nyquist frequency 100 and its corresponding sampling frequency 200.

In another contemplated embodiment, the electromechanical system measured and modified is a production lot of identically-manufactured devices. A subset of the devices is selected 910, measurements from which are combined and used to configure other devices in the production lot 957. Because the present manufacturing method need not involve significant modifications to any devices in the sample, and because it need not take a long time, it is particularly well-suited to being performed on large samples.

All of the structures described above will be understood to one of ordinary skill in the art, and would enable the practice of the present invention without undue experimentation. It is to be understood that even though numerous characteristics and advantages of various embodiments of the present invention have been set forth in the foregoing description, together with details of the structure and function of various embodiments of the invention, this disclosure is illustrative only. Changes may be made in the details, especially in matters of structure and arrangement of parts within the principles of the present invention to the full extent indicated by the broad general meaning of the terms in which the appended claims are expressed. For example, the particular elements may vary depending on the particular application for the present system while maintaining substantially the same functionality, without departing from the scope and spirit of the present invention. In addition, although the preferred embodiments described herein are largely directed to disc drive production lots, it will be appreciated by those skilled in the art that the teachings of the present invention can be applied to equivalent electromechanical systems without departing from the scope and spirit of the present invention.

What is claimed is:

1. A method of configuring an electromechanical system for improved position control, the system having a first spindle with a controllable rotation speed, the method including acts of:
   (a) receiving a position-indicative signal while rotating the first spindle;
   (b) estimating a resonance frequency from at least one resonance indicator derived from the position-indicative signal;
   (c) monitoring the resonance indicator before and after changing the spindle speed; and
   (d) configuring the electromechanical system to generate a servo control signal having a gain at the estimated resonance frequency that depends on whether the resonance indicator changes during the monitoring act (c).

2. The method of claim 1 in which the receiving act (a) includes an act of receiving the position-indicative signal sampled at a sampling rate that depends upon the spindle rotation speed, and in which the estimated resonance frequency differs from the sampling rate by an amount about equal to an apparent resonance frequency.

3. The method of claim 1 in which the position-indicative signal includes radial position measurements sampled at a sampling rate.

4. The method of claim 3 in which the estimated resonance frequency is about equal to an apparent frequency of a resonance.

5. The method of claim 3 in which the resonance indicator contains information about a magnitude of a resonance.

6. The method of claim 3 in which the resonance indicator is an apparent frequency of the resonance.

7. The method of claim 1 in which the electromechanical system is a production lot of disc drives consisting of many representative disc drives and many represented disc drives, in which the estimating act (b) includes an act (b1) of deriving each resonance indicator by measuring each representative disc drive and an act (b2) of combining the derived indicators into the estimated resonance frequency, the deriving act (b1) being omitted for at least one of the represented disc drives, and in which the configuring act (d) includes an act of recording the combined resonance frequency into each disc drive of the lot.

8. The method of claim 1 in which the estimating act (b) includes an act of generating a plurality of other plausible frequencies, further including an act (e) of distinguishing the estimated resonance frequency from the other plausible frequencies depending on how fast an apparent resonance frequency shifts in response to a change in the spindle speed.

9. A method of minimizing a compensation for a resonance comprising the step of determining the resonance by varying a Nyquist frequency, wherein the step of varying includes varying a spindle motor speed.

10. The method of claim 9 wherein the resonance is an aliased resonance.

11. A method of attenuating at least one resonance of a plurality of resonances comprising the steps of:
   comparing a first resonance indicator of a first Nyquist frequency and a corresponding second resonance indicator of a second Nyquist frequency; and
   providing attenuation if the comparison is within a predetermined range.

* * * * *